US010764469B2

(12) United States Patent
Suwa et al.

(10) Patent No.: US 10,764,469 B2
(45) Date of Patent: Sep. 1, 2020

(54) IMAGE PROCESSING APPARATUS, IMAGE PROCESSING METHOD, AND STORAGE MEDIUM THAT CONVERT AN INPUT LUMINANCE SIGNAL INCLUDED IN IMAGE DATA INTO AN OUTPUT SIGNAL FOR PRINTING BY USING A CONVERSION PARAMETER

(71) Applicant: CANON KABUSHIKI KAISHA, Tokyo (JP)

(72) Inventors: Tetsuya Suwa, Yokohama (JP); Hidetsugu Kagawa, Kawasaki (JP); Satoshi Wada, Machida (JP); Kei Yoshizawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/418,351

(22) Filed: May 21, 2019

(65) Prior Publication Data
US 2019/0364171 A1    Nov. 28, 2019

(30) Foreign Application Priority Data
May 25, 2018 (JP) ................................ 2018-100888

(51) Int. Cl.
*H04N 1/40*        (2006.01)
*H04N 1/407*       (2006.01)
(Continued)

(52) U.S. Cl.
CPC ......... *H04N 1/4074* (2013.01); *G06K 15/102* (2013.01); *G06K 15/1872* (2013.01); *H04N 1/00172* (2013.01); *H04N 1/00188* (2013.01)

(58) Field of Classification Search
None
See application file for complete search history.

(56) References Cited

U.S. PATENT DOCUMENTS 6,911,988 B1 *   6/2005   Tsujii ..................... A61B 6/465
                                                 345/581
7,650,045 B2 *   1/2010   Yano ...................... G06T 5/008
                                                 382/274
(Continued)

FOREIGN PATENT DOCUMENTS

| JP | 2015-156615 A | 8/2015 |
| JP | 5770865 B2 | 8/2015 |
| JP | 5829758 B2 | 12/2015 |

*Primary Examiner* — Dung D Tran
(74) *Attorney, Agent, or Firm* — Venable LLP

(57) ABSTRACT

An image processing apparatus includes an obtaining unit to obtain image data and a dynamic range conversion unit to convert an input luminance signal included in the image data into an output luminance signal for an image printing apparatus by using a conversion parameter. A dynamic range of luminance of the converted image data is narrower than that of the unconverted image data before the dynamic range conversion. When the input luminance signal indicates an input black reference luminance value, the output luminance signal indicates an output black reference luminance value, and, when the input luminance signal indicates a predetermined reference input luminance value, the output luminance signal indicates a reference output luminance value, the reference output luminance value being a value calculated based on the predetermined reference input luminance value and the output black reference luminance value for observing a print product to be printed by the printing apparatus.

41 Claims, 12 Drawing Sheets

(51) Int. Cl.
   *H04N 1/00*    (2006.01)
   *G06K 15/02*   (2006.01)
   *G06K 15/10*   (2006.01)

(56) References Cited

U.S. PATENT DOCUMENTS

| | | |
|---|---|---|
| 8,593,480 B1 | 11/2013 | Ballestad et al. |
| 9,224,363 B2 | 12/2015 | Ballestad et al. |
| 9,338,389 B2 | 5/2016 | Messmer |
| 9,652,687 B2 | 5/2017 | Sato |
| 9,667,910 B2 | 5/2017 | Messmer |
| 9,916,809 B2 | 3/2018 | Ballestad et al. |
| 10,255,879 B2 | 4/2019 | Ballestad et al. |
| 2005/0046902 A1* | 3/2005 | Sugimoto ............... G06T 5/009 358/3.01 |
| 2010/0053376 A1* | 3/2010 | Fukuda .................. G06T 5/009 348/235 |
| 2013/0328907 A1 | 12/2013 | Ballestad et al. |
| 2014/0002478 A1 | 1/2014 | Ballestad et al. |
| 2015/0042890 A1 | 2/2015 | Messmer |
| 2015/0245000 A1 | 8/2015 | Sato |
| 2016/0071484 A1 | 3/2016 | Ballestad et al. |
| 2016/0249009 A1 | 8/2016 | Messmer |
| 2016/0352995 A1* | 12/2016 | Min ..................... H04N 5/2355 |
| 2018/0061199 A1* | 3/2018 | Sakomizu ............. H04N 19/17 |
| 2018/0182352 A1 | 8/2018 | Ballestad et al. |
| 2018/0314182 A1* | 11/2018 | Wada .................. G03G 15/043 |

\* cited by examiner

CAMERA INFORMATION

| R (%) | | NORMAL MODE | HIGH-LUMINANCE OBTAINING MODE |
|---|---|---|---|
| CAMERA TYPE | A | 220 | 440 |
| | B | 250 | 50 |
| | C | 260 | 520 |

FIG.5A

LIGHT LUMINANCE INFORMATION (100 cd/m$^2$)

| LUMINANCE VALUE (cd/m$^2$) | | OUTPUT BLACK REFERENCE LUMINANCE VALUE Yo(d) | OUTPUT WHITE REFERENCE LUMINANCE VALUE Yo(w) |
|---|---|---|---|
| PRINT MEDIUM TYPE | I | 5 | 90 |
| | II | 10 | 88 |
| | III | 15 | 82 |

FIG.5B

LIGHT LUMINANCE INFORMATION (200 cd/m$^2$)

| LUMINANCE VALUE (cd/m$^2$) | | OUTPUT BLACK REFERENCE LUMINANCE VALUE Yo(d) | OUTPUT WHITE REFERENCE LUMINANCE VALUE Yo(w) |
|---|---|---|---|
| PRINT MEDIUM TYPE | I | 9 | 180 |
| | II | 19 | 175 |
| | III | 32 | 160 |

FIG.5C

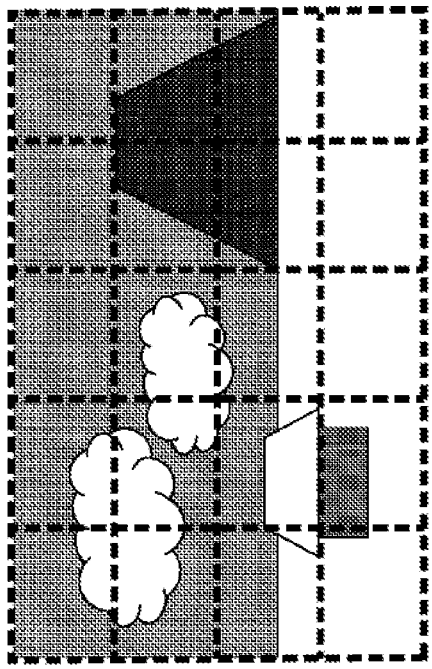
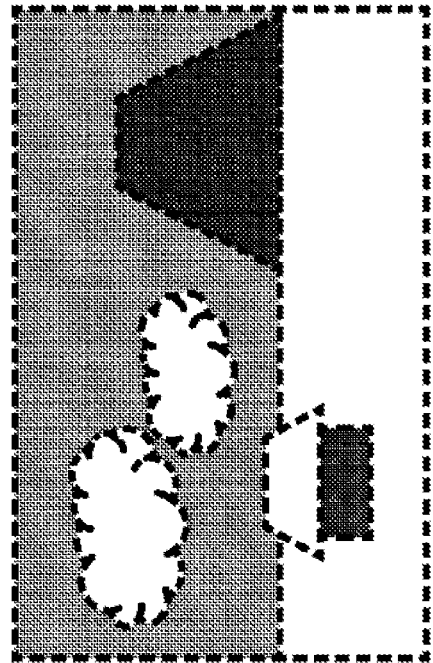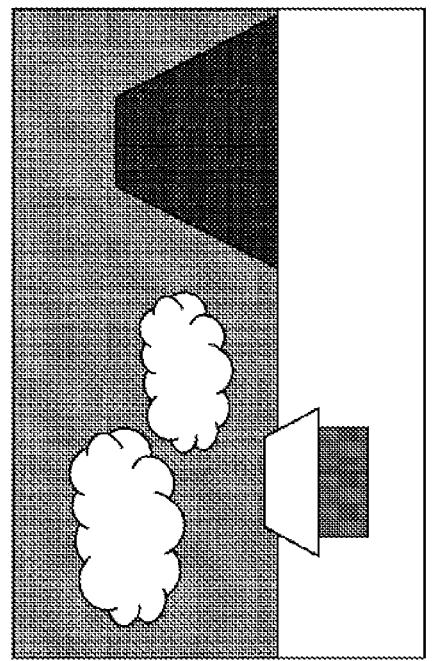
FIG.10A
FIG.10B
FIG.10C

IMAGE PROCESSING APPARATUS, IMAGE PROCESSING METHOD, AND STORAGE MEDIUM THAT CONVERT AN INPUT LUMINANCE SIGNAL INCLUDED IN IMAGE DATA INTO AN OUTPUT SIGNAL FOR PRINTING BY USING A CONVERSION PARAMETER

This application claims the benefit of Japanese Patent Application No 2018-100888, filed May 25, 2018, which is hereby incorporated by reference in its entirety.

BACKGROUND OF THE INVENTION

Field of the Invention

The present invention relates to an image processing apparatus and an image processing method for printing a captured image.

Description of the Related Art

In image capture devices such as digital cameras, the luminance range of light that their sensors for converting light into signals can receive has been becoming wider. Thus, a high-luminance region that would be saturated with a conventional technique (highlight-detail loss) can now be obtained as information with a tonality. There has also been progress in techniques for widening the reproduction range in development processes performed to reproduce image data received from an image capture device on another device. For example, Japanese Patent Laid-Open No. 2015-156615 discloses a method involving calculating a saturation level for each color signal of image data received from an image capture device, and adjusting the dynamic range so as to prevent loss of the tonality in any high-luminance region(s). Thus, owing to both the improvement in performance of image capture devices and image processing on image data received from an image capture device, an image can now be expressed with a wider dynamic range than conventional ranges.

Meanwhile, there is a certain inevitable difference between the dynamic range of an input image and the dynamic range of its output image that can be expressed. Generally, the dynamic range of an input image is wider than the dynamic range of its output image, and the development process needs a suitable compressive conversion process that does not cause a feeling of strangeness between these two dynamic ranges.

Japanese Patent No. 5770865 discloses a method involving preparing a plurality of anchor points and a free parameter for a luminance function for conversion from input data into output data, and performing a compressive conversion on the dynamic range by using a sigmoid function.

Also, Japanese Patent No. 5829758 discloses a method of compressing the dynamic range of an input video (image capture device) without destroying the intent of the input video's creator by preparing a common anchor point for the input video.

Meanwhile, in recent years, an exhibition method has become popular in which an image printed by an inkjet printer, or the like, is further illuminated with high-luminance light. FIGS. 12A and 12B are diagrams illustrating such an exhibition method (hereafter referred to as "illumination exhibition method") and how the dynamic range changes.

In FIG. 12A, the surface of a print product 501 printed by an inkjet printer, or the like, is illuminated with light by a high-luminance light 503 having a higher luminous intensity than that of a normal light 502, and observers view reflected light on the print product 501 with their eyes. In this way, the observers can perceive the image with higher luminance than that of the image observed under the normal light 502.

FIG. 12B is a diagram for comparing the dynamic range of input data (RAW data) obtained by an image capture device and provided to an image processing apparatus, the dynamic range of a print product printed by a printing apparatus and illuminated by the normal light 502, and the dynamic range of the above print product illuminated with a high-luminance light 503. The dynamic range of the print product under the normal light 502 is narrower than the dynamic range of the input image. However, by illuminating this print product with the high-luminance light 503, the dynamic range is widened to be comparable to or wider than that of the input image.

Note that in such an illumination exhibition method, the illumination with the high-luminance light also arises the luminance of dark regions (black regions). Then, in a case when the creator sets an anchor point at which the luminance value is desired to be fixed, as in Japanese Patent No. 5829758, the dynamic range from the lowest luminance to the anchor point is forcibly compressed. This makes it impossible to express sufficient tones in the range.

SUMMARY OF THE INVENTION

The present invention has been made to solve the above problem. Thus, an object of the present invention is to provide a dynamic range conversion method capable of obtaining suitable contrast and tonality on an entire image while also maintaining a luminance value that the creator wishes to maintain.

According to a first aspect, the present invention provides an image processing apparatus comprising a unit configured to obtain captured-image data captured by an image capture device, a development unit configured to perform a development process on the captured image data to thereby generate developed data, the development process being based on the image capture device, and a dynamic range compression unit configured to convert an input luminance signal included in the developed data into an output luminance signal for an image printing apparatus by using a conversion parameter such that a dynamic range of luminance information included in the developed data corresponds to a dynamic range of luminance information for observation of a print product, wherein the dynamic range compression unit obtains an input black reference luminance value and an input white reference luminance value of the luminance information included in the developed data, on a basis of print medium information for printing by the image printing apparatus and observation environment information for observing a print product obtained by the printing, obtains an output black reference luminance value and an output white reference luminance value of the luminance information for observation of the print product, on a basis of the print medium information and the observation environment information, calculates a reference output luminance value for observation of the print product, the reference output luminance value corresponding to a predetermined reference input luminance value included in the developed data, and generates a conversion line and generates the conversion parameter by using the conversion line, the conversion line indicating a correspondence between the input luminance signal and the output luminance signal such that the input black reference luminance value corresponds to the output black reference luminance value, the input white reference luminance value corresponds to the output white reference luminance value, and the reference input luminance value corresponds to the reference output luminance value.

According to a second aspect, the present invention provides an image processing method comprising obtaining image data captured by an image capture device, performing a development process on the captured image data to thereby generate developed data, the development process being based on the image capture device, converting an input luminance signal included in the developed data into an output luminance signal for an image printing apparatus by using a conversion parameter such that a dynamic range of luminance information included in the developed data corresponds to a dynamic range of luminance information for observation of a print product, and generating image data printable by the image printing apparatus, wherein the converting comprises obtaining an input black reference luminance value and an input white reference luminance value of the luminance information included in the developed data, on a basis of print medium information for printing by the image printing apparatus and observation environment information for observing a print product obtained by the printing, obtaining an output black reference luminance value and an output white reference luminance value of the luminance information for observation of the print product, on a basis of the print medium information and the observation environment information, calculating a reference output luminance value for observation of the print product, the reference output luminance value corresponding to a predetermined reference input luminance value included in the developed data, and generating a conversion line and generating the conversion parameter by using the conversion line, the conversion line indicating a correspondence between the input luminance signal and the output luminance signal such that the input black reference luminance value corresponds to the output black reference luminance value, the input white reference luminance value corresponds to the output white reference luminance value, and the reference input luminance value corresponds to the reference output luminance value.

Further features of the present invention will become apparent from the following description of exemplary embodiments with reference to the attached drawings.

BRIEF DESCRIPTION OF THE DRAWINGS

FIGS. 5A to 5C are diagrams illustrating input dynamic range information and output dynamic range information;

FIGS. 10A to 10C are diagrams illustrating how an image is divided;

DESCRIPTION OF THE EMBODIMENTS

First Embodiment

Figure 1:
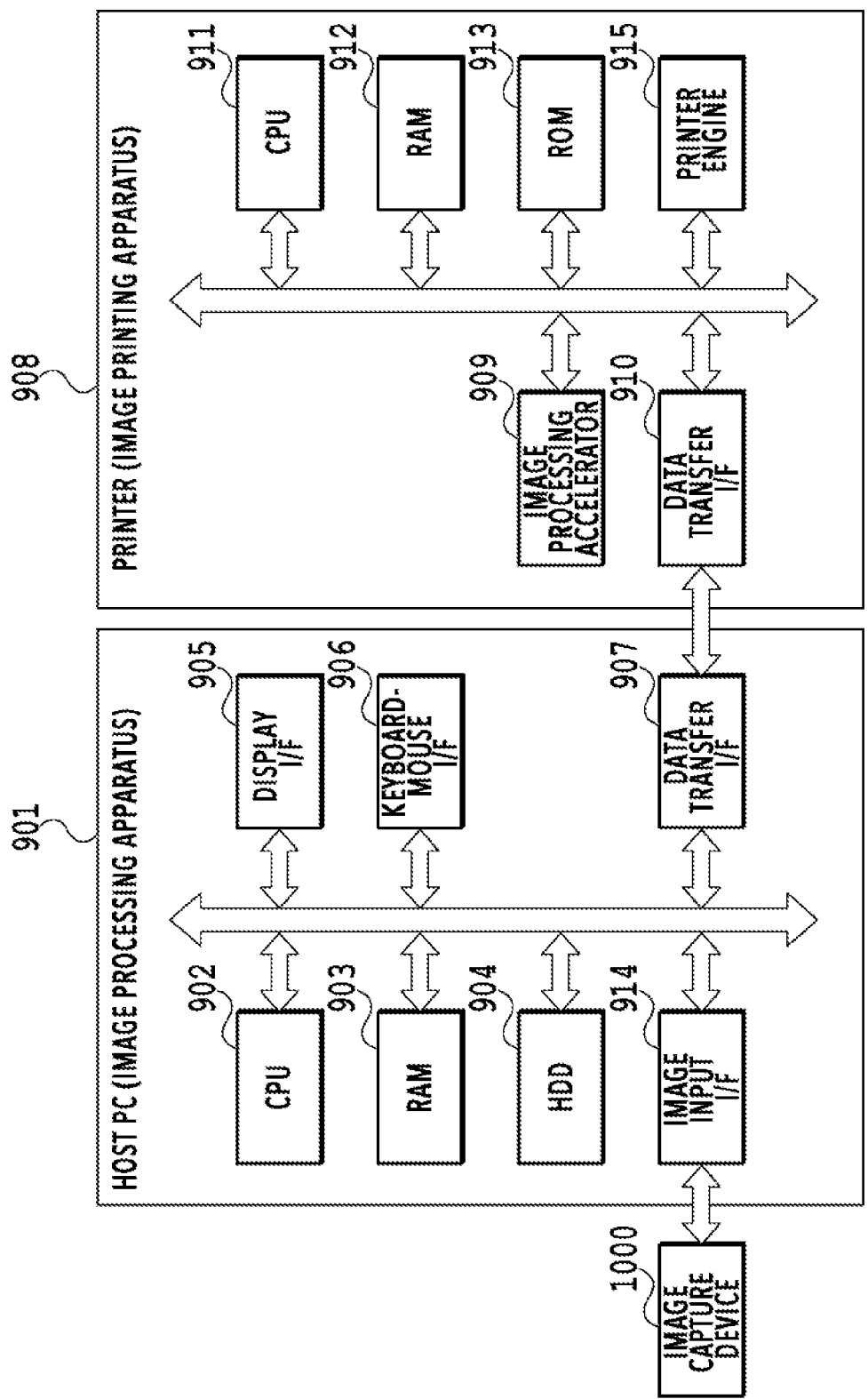
FIG. 1 is a block diagram for explaining the configuration of a printing system.

FIG. 1 is a block diagram for explaining the configuration of a printing system usable in the present invention. A printing system in the present embodiment mainly comprises an image capture device 1000 such as a digital camera, an image processing apparatus 901 such as a personal computer (PC), and an image printing apparatus 908 such as an inkjet printer that ejects ink to print an image. The image capture device 1000 captures an image by using a predetermined sensor and obtains the image as image data. The image data obtained by the image capture device 1000 is inputted into the image processing apparatus 901 through an image input I/F 914. The image data after undergoing predetermined image processing in the image processing apparatus 901 is inputted as print data into the image printing apparatus 908.

Figure 12A:
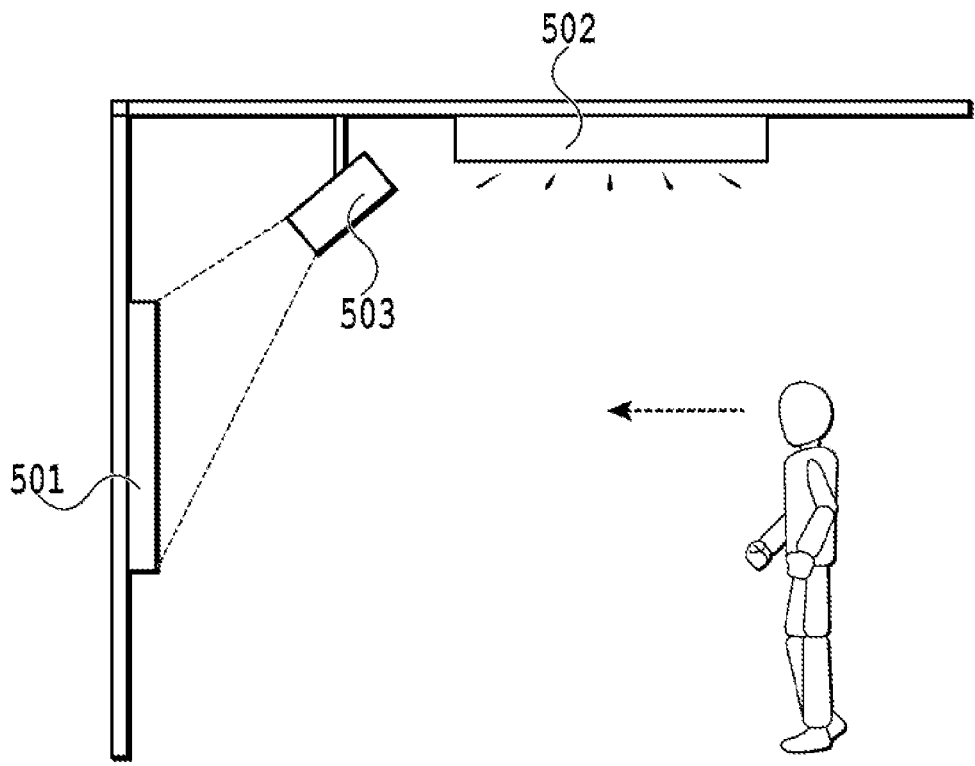
FIGS. 12A and 12B are diagrams for explaining an illumination exhibition method.

The image printing apparatus 908 prints an image onto a predetermined print medium by following the print data received from the image processing apparatus 901, and outputs the print product. In the present embodiment, the outputted print product will be observed using an illumination exhibition method as illustrated in FIG. 12A. Thus, the image processing apparatus 901 is required to perform image processing, on the image data obtained from the image capture device 1000, that reproduces intended colors under illumination by a high-luminance light. Meanwhile, the configuration does not have to be such that the image capture device 1000 is directly connected to the image processing apparatus 901. For example, the configuration may be such that image data obtained by an image capture device is supplied to the image processing apparatus 901 through a medium such as a memory card.

Control configurations of the image processing apparatus 901 and the image printing apparatus 908 will be described below. In the image processing apparatus 901, a CPU 902 executes various processes by following a program held in an HDD 904 with an RAM 903 as a work area. For example, the CPU 902 generates print data that can be printed by the image printing apparatus 908 by following a command received from the user through a keyboard-mouse I/F 906 and the program held in the HDD 904, and transfers this print data to the image printing apparatus 908. Also, the CPU 902 performs a predetermined process on image data received from the image printing apparatus 908 through a data transfer I/F 907 by following the program stored in the HDD, and displays its result and various pieces of information on a display (not illustrated) through a display I/F 905.

On the other hand, in the image printing apparatus 908, a CPU 911 executes various processes by following a program held in a ROM 913 with a RAM 912 as a work area. The image printing apparatus 908 comprises an image processing accelerator 909 for performing high-speed image processing.

The image processing accelerator 909 is hardware capable of executing image processing at higher speed than the CPU 911 does. The image processing accelerator 909 is booted as the CPU 911 writes parameters and data necessary for image processing to predetermined addresses in the RAM 912. The image processing accelerator 909 reads the parameters and data, and then executes predetermined image processing on the data. Note that the image processing accelerator 909 is not an essential element, and equivalent processing can be executed with the CPU 911.

USB, IEEE1394, wired LAN, wireless LAN, or the like, is usable as the connection scheme for the data transfer I/F 907 in the image processing apparatus 901 and the data transfer I/F 910 in the image printing apparatus 908.

A printer engine 915 is an engine that drives various mechanisms for printing an image onto a print medium such as a sheet. By following print data received from the data transfer I/F 910, the CPU 911 controls the printer engine 915 to print an image onto a specified sheet and to output the print product.

Figure 2:
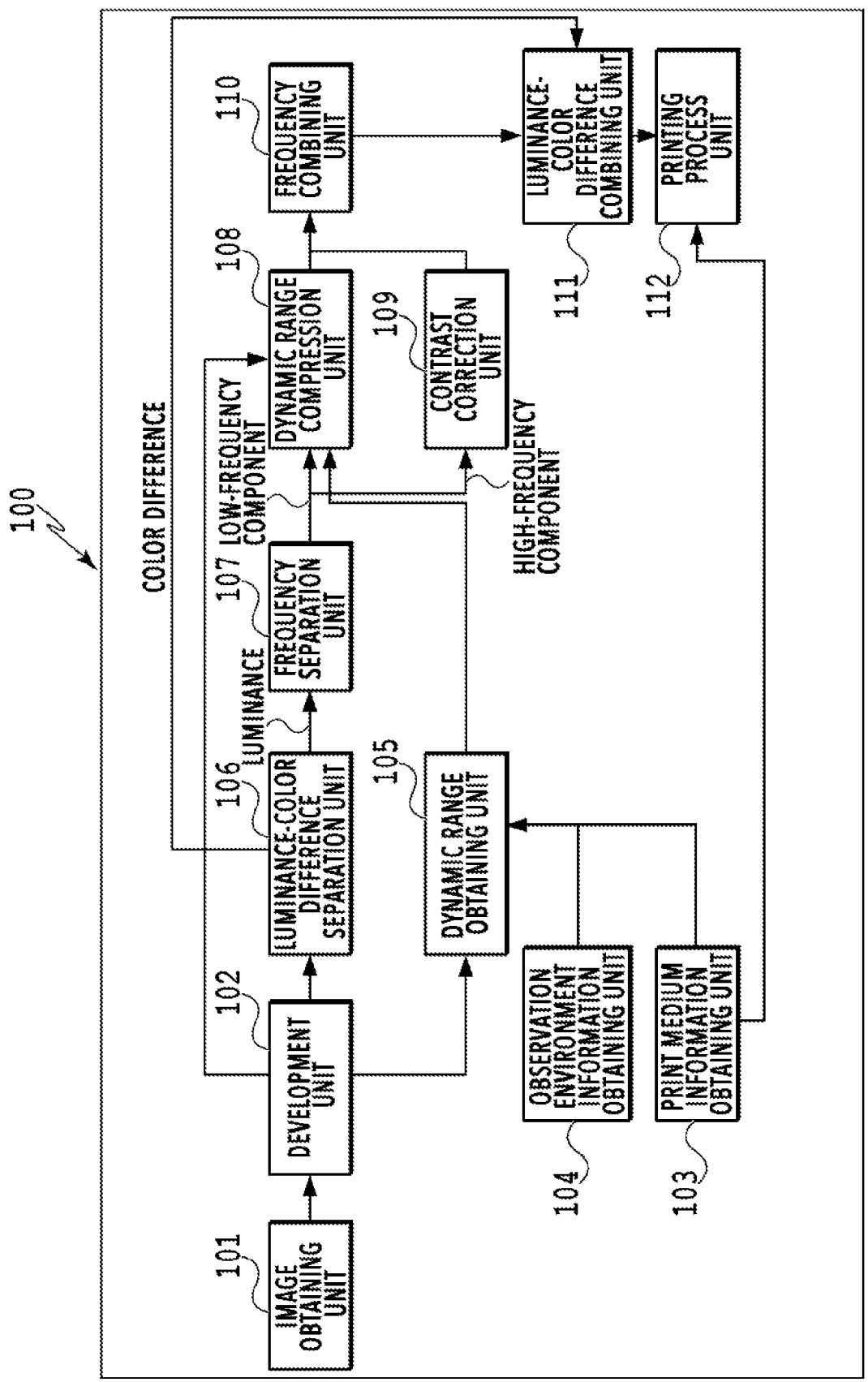
FIG. 2 is a block diagram for explaining a software configuration for image processing.

FIG. 2 is a block diagram for explaining a software configuration for the image processing to be executed by the image processing apparatus 901. An image processing unit 100 is an application. The CPU 902 of the image processing apparatus 901 implements the functions of the individual blocks included in the image processing unit 100 by following the program held in the HDD 904 with the RAM 903 as a work area. Note that the image processing unit 100 does not have to be configured with a single application. The image processing unit 100 may be configured with a plurality of applications depending on the user's usage and the required functions. Also, the configuration may be such that the image capture device 1000 and/or the image printing apparatus 908 implements some of the block functions.

An image obtaining unit 101 obtains and stores image data inputted through the image input I/F 914. A development unit 102 converts the stored image data into a predetermined format and also obtains dynamic range information on the inputted image data. The image data after the format conversion is sent to a luminance-color difference separation unit 106, and the dynamic range information is provided to a dynamic range obtaining unit 105.

The luminance-color difference separation unit 106 separates the image data converted by the development unit 102 into a luminance component (Y) and a color difference component (Cb, Cr). The luminance component (Y) is transmitted to a frequency separation unit 107 and then undergoes various processes. On the other hand, the color difference component (Cb, Cr) is held in a luminance-color difference combining unit 111 until being combined with the luminance component (Y) having undergone the various processes.

The frequency separation unit 107 separates the luminance component separated by the luminance-color difference separation unit 106 into a low-frequency component and a high-frequency component and transmits the low-frequency component to a dynamic range compression unit 108 and the high-frequency component to a contrast correction unit 109.

Meanwhile, an observation environment information obtaining unit 104 obtains information on the observation environment in which the print product is to be observed such as the brightness of the high-luminance light, the size of the wall on which the print product is to be exhibited, and the size of the exhibition site. Also, a print medium information obtaining unit 103 obtains information on the print medium (sheet) onto which the image printing apparatus 908 is to print an image such as the type and size of the print medium. The information on the observation environment and the information on the print medium can be inputted by the user with a keyboard and/or a mouse. The information on the observation environment, the information on the print medium, and further, the type of ink to be used by the image printing apparatus, and so on, determine the dynamic range of the print product when it is observed.

The dynamic range obtaining unit 105 transmits the dynamic range information on the input image provided from the development unit 102, the information obtained by the observation environment information obtaining unit 104, and the information obtained by the print medium information obtaining unit 103 to the dynamic range compression unit 108.

On the basis of the dynamic range information on the input image and an output image obtained from the dynamic range obtaining unit, the dynamic range compression unit 108 performs a dynamic range compression process on luminance data (Y) of the low-frequency component received from the frequency separation unit 107.

The contrast correction unit 109 performs a contrast correction process on luminance information on the high-frequency component received from the frequency separation unit 107.

A frequency combining unit 110 combines the low-frequency component having undergone the dynamic range compression process at the dynamic range compression unit 108 and the high-frequency component having undergone the contrast correction process at the contrast correction unit 109. The luminance-color difference combining unit 111 combines the luminance data (Y) separated by the luminance-color difference separation unit 106 and having undergone the above series of processes and the color difference component (Cb, Cr), separated by the luminance-color difference separation unit 106, to thereby generate RGB data, and transmits it to a printing process unit 112.

The printing process unit 112 generates print data that can be printed by the image printing apparatus 908 on the basis of the RGB image data received from the luminance-color difference combining unit 111 and the print medium information obtained by the print medium information obtaining unit 103.

Figure 3:
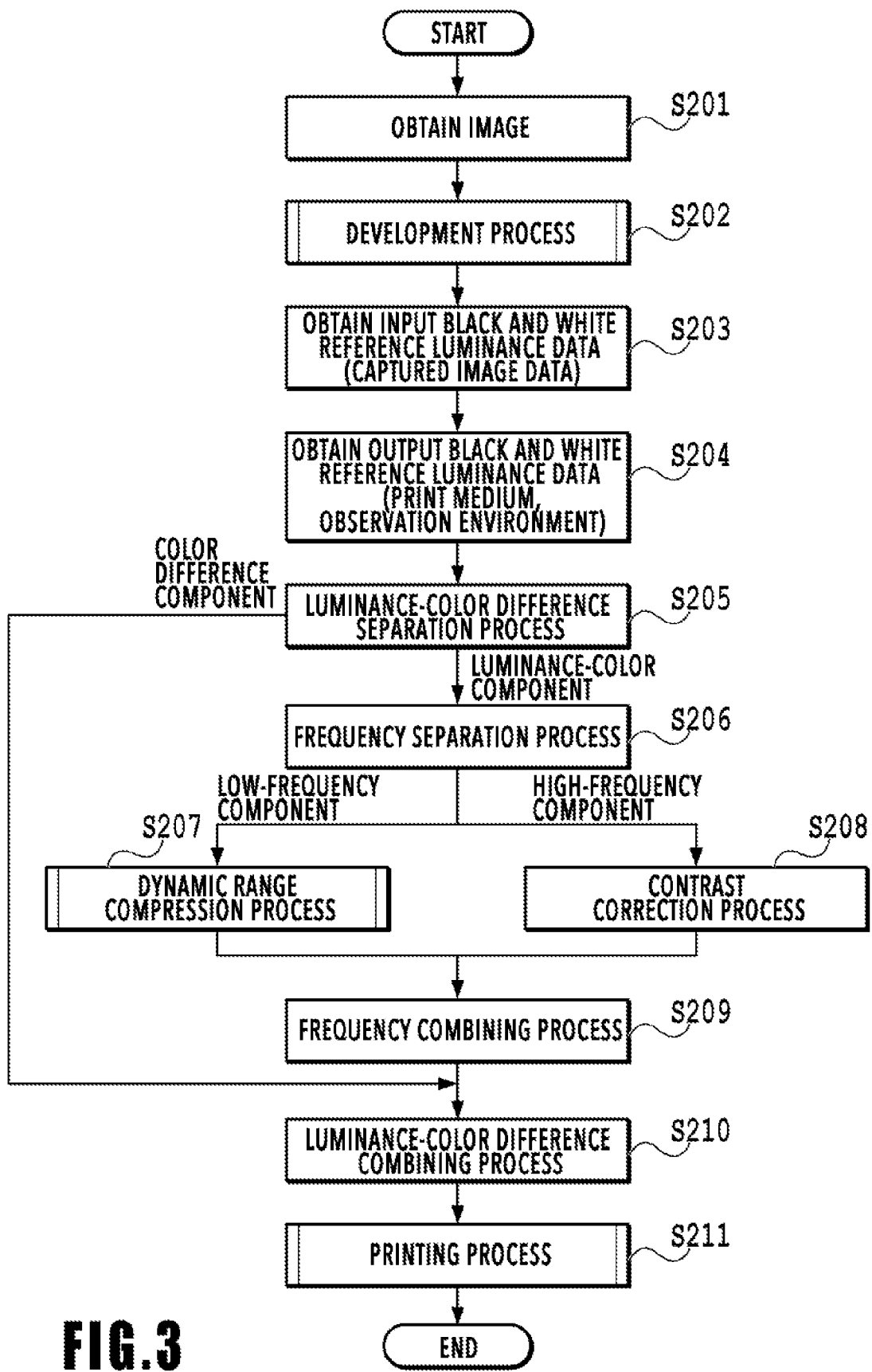
FIG. 3 is a flowchart for explaining steps in the image processing.

FIG. 3 is a flowchart for explaining steps in the image processing performed by the image processing unit 100. This processing is started, for example, upon input of an instruction to perform printing for illumination exhibition from the user, and executed by the CPU 902 of the image processing apparatus 901 by controlling the blocks described with reference to FIG. 2 in accordance with the program stored in the HDD 904.

Upon a start of this processing, first, in step S201, the image obtaining unit 101 obtains image data. The data obtained here is unprocessed image data captured by the image capture device (RAW data).

In step S202, the development unit 102 executes a predetermined development process on the RAW data obtained from the image obtaining unit 101.

Figure 4:
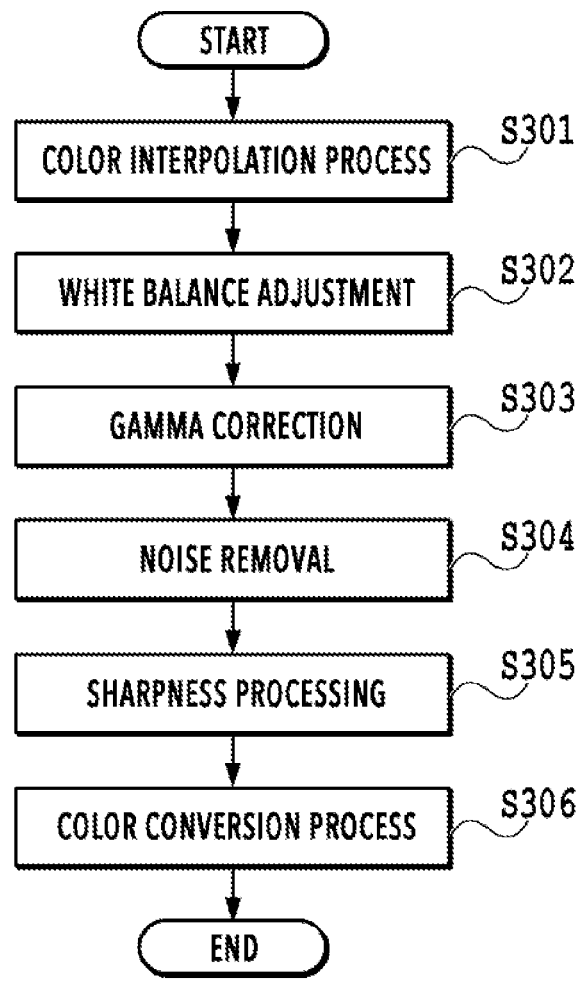
FIG. 4 is a flowchart for explaining a development process.

FIG. 4 is a flowchart for explaining the development process executed by the development unit 102 in step S202. Upon a start of this process, the development unit 102 performs a color interpolation process in step S301. The color interpolation process is a process for converting the pixel arrangement of the RAW data into a general pixel arrangement (matrix arrangement). Specifically, a debayering process, a mosaicing process, or the like, is employed. In the present embodiment, by the color interpolation process, RGB image data is obtained in which the RAW data, having RGB three-dimensional information, is arranged with a predetermined resolution.

In step S302, the development unit 102 performs a white balance adjustment. Specifically, the development unit 102 multiplies R, G, and B signal values by respective preset coefficients to obtain new R, G, and B signal values.

In step S303, the development unit 102 performs a gamma correction based on development settings and characteristics of a display apparatus (display). In the gamma correction, the development unit 102 performs a linear transformation process such that the luminance values to be displayed on the display have suitable tones with respect to the respective input signals.

In step S304, the development unit 102 performs a noise removal process. Further, in step S305, the development unit 102 performs sharpness processing. Both the noise removal process and the sharpness processing are filtering processes using filters prepared in advance. These processing steps are not essential and may be selectively performed on the basis of user settings and image capture conditions.

In step S306, the development unit 102 performs a color conversion process. In the color conversion process, the development unit 102 performs processes of adjusting hues and of suppressing color curving in high-luminance regions, as well as conversion into a predetermined color space. By the above step, this process (the development process in step S202) ends. By the above-described development process, developed data is generated, which is formed of RGB luminance signals having versatile gamma characteristics.

Referring back to the flowchart in FIG. 3, in step S203, the CPU 902 obtains an input white reference luminance value Yi(w) as a white reference and an input black reference luminance value Yi(d) as a black reference of the input image. The input white reference luminance value Yi(w) is calculated from image capture device information inputted along with the RAW data, a value calculated from image capture setting information, and an expansion value N obtained in the development process in step S202.

FIG. 5A is a diagram illustrating the correspondences between combinations of the image capture device information (camera type A to C) and the image capture setting information, and respective input white reference luminance values Yi(w) (R % in FIG. 5A). As the image capture setting information, "normal mode" for capturing an image with standard exposure and "high-luminance obtaining mode" for capturing an image with underexposure as compared to normal exposure are prepared. Each of the input white reference luminance values Yi(w) (R %) corresponding to the individual combinations represents the highest luminance value (the luminance value of the white reference) in a state when a luminance value obtained by performing photometry during the image capture (specifically, a luminance value at which the creator wishes to maintain) is a=18%. For all camera types, the highest luminance value is set to be higher for the high-luminance obtaining mode, in which an image is captured with underexposure, than for the normal mode. Then, the input white reference luminance value Yi(w) obtained from this table is further corrected as below with (equation 1) in the case when the expansion number N, obtained in the development process in S202, is not 1.

$$Yi(w)=Yi(w)\times 2^N \quad \text{(equation 1)}$$

On the other hand, in S203, the input black reference luminance value Yi(d) is set to "0%" since it assumes no incidence of light.

In S204, the CPU 902 obtains an output black reference luminance value Yo(d) and an output white reference luminance value Yo(w) of the output image on the basis of the brightness of the high-luminance light obtained from the observation environment information obtaining unit 104 and the print medium information obtained from the print medium information obtaining unit 103.

FIGS. 5B and 5C are diagrams illustrating output black reference luminance values Yo(d) as black references and output white reference luminance values Yo(w) as white references in association with print medium types (I, II, III). In the tables, the unit of each luminance value is cd/m² (luminous intensity per unit area). FIG. 5B illustrates a case when the brightness of the high-luminance light is 100 cd/m², and FIG. 5C illustrates a case when the brightness of the high-luminance light is 200 cd/m². Each output black reference luminance value Yo(d) is equivalent to the luminance value of reflected light obtained by illuminating a black region of the corresponding print medium with the corresponding light. Each output white reference luminance value Yo(w) is equivalent to the luminance value of reflected light obtained by illuminating a white region of the corresponding print medium with the corresponding light.

The print medium types (I, II, III) include a plurality of types with different characteristics, such as glossy paper with a glossy surface, matte paper with no glossy surface, and a sheet of a plastic base material coated with a dye receiving layer. For example, glossy paper has higher black density (lower luminance) than that of matte paper and has a wider dynamic range between black (output black reference luminance value) and white (output white reference luminance value).

Here, FIGS. 5B and 5C represent two levels of brightness of a high-luminance light. However, additional different levels of brightness may be prepared. Also, each luminance value may be a value converted with visual characteristics taken into consideration.

Referring back to the flowchart in FIG. 3, in S205, the luminance-color difference separation unit 106 separates the RGB data outputted from the development unit 102 into luminance data (Y) and hue data (Cb, Cr). This separation process can be performed with (equation 2).

$$Y=0.29900\times R+0.58700\times G+0.11400\times B$$

$$Cb=-0.16874\times R-0.33126\times G+0.50000\times B$$

$$Cr=0.50000\times R-0.41869\times G-0.081\times B \quad \text{(equation 2)}$$

Note that, in the present embodiment, each luminance signal Y after the separation process is a 16-bit signal having one of levels of 0 to 65535.

In step S206, the frequency separation unit 107 separates the luminance data (Y) generated in step S205 into a low-frequency component and a high-frequency component. A low-pass filter can be used for the separation (extraction) of the low-frequency component. As for the processing method, spatial filtering may be used, or the luminance data may first be transformed into spatial frequencies by FFT, undergo a filtering process, and then be inversely transformed by IFFT. The target frequencies may be determined by taking into consideration the size of the print medium, the observation distance to the print product, characteristics of the human vision, and so on. The high-frequency component may be separated using a high-pass filter having the opposite effect from the effect of the low-pass filter. Alternatively, the high-frequency component may be obtained by subtracting the low-frequency component, generated with the above low-pass filter, from the original image.

In step S207, the dynamic range compression unit 108 generates a conversion parameter for dynamic range compression by using Yi(w), Yi(d), Yo(w), and Yo(d) obtained in steps S203 and S204. This conversion parameter may be, for example, a one-dimensional LUT for converting each 16-bit luminance signal Y into also a 16-bit luminance signal Y', or a function for conversion from an input luminance signal to an output luminance signal. Then, using the conversion parameter thus generated, the dynamic range compression unit 108 converts the input luminance signal of each pixel into an output luminance signal. Note that details of the above conversion parameter will be specifically described later.

In step S208, the contrast correction unit 109 executes a predetermined contrast correction process on the luminance data in the high-frequency component image generated in step S206. Specifically, the contrast correction unit 109 multiplies each piece of luminance data (Y) by a predetermined coefficient k≥1. This emphasizes the contrast of the high-frequency component. In doing the above, the coefficient k can be adjusted in accordance with the situation. For example, k may be set close to "1" in the case when one wishes to express a contrast similar to that during the image capture. Also, in the case when ink bleed is noticeable at the image printing apparatus or in other similar cases, the value of k may be increased to reduce the frequency of application of ink to the print medium.

In step S209, the frequency combining unit 110 combines the low-frequency component having undergone the dynamic range compression process in step S207 and the high-frequency component having undergone the contrast correction process in step S208 to thereby obtain luminance data having a predetermined compressed dynamic range and corrected contrast.

In step S210, the luminance-color difference combining unit 111 calculates RGB data with (equation 3) by using the luminance data (luminance component Y) generated in S209 and the hue component (Cb, Cr) separated in step S206.

$$R = Y + 1.40200 \times Cr$$

$$G = Y - 0.34414 \times Cb - 0.71414 \times Cr$$

$$B = Y + 1.77200 \times Cb \quad \text{(equation 3)}$$

In step S211, the printing process unit 112 performs image processing for a printing process on the RGB data calculated in step S210.

Figure 6:
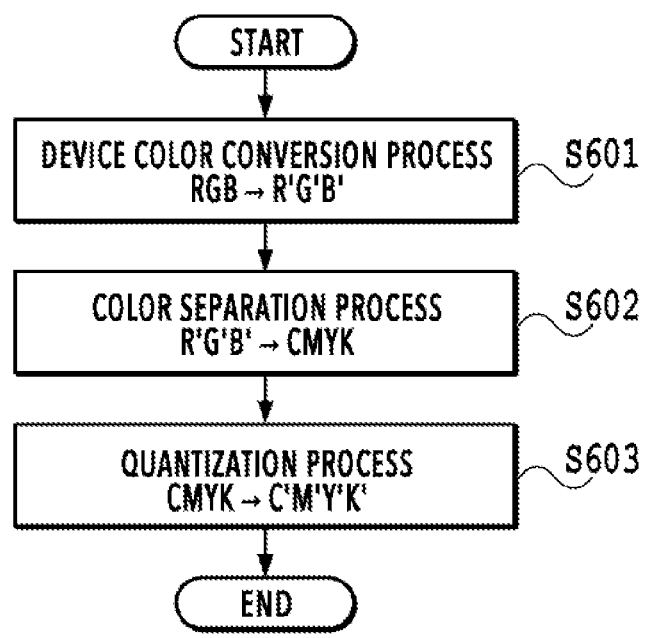
FIG. 6 is a flowchart for explaining steps in a printing process.

FIG. 6 is a flowchart for explaining steps in the printing process executed by the printing process unit 112 in step S212. Upon a start of this process, first, in step S601, the printing process unit 112 performs a device color conversion process. Specifically, the printing process unit 112 performs a conversion process for linking the color space of the currently held RGB data to a color space that can be expressed by the image printing apparatus 908 (specifically, a color space that can express the print product outputted by the image printing apparatus 908 under the illumination by the high-luminance light). The conversion may be done by a calculation using a mathematical equation or be done using a three-dimensional LUT in which input signal values R, G, and B and output signal values R', G', and B' at some grid points correspond to each other. In the latter case, output signal values R', G', and B' at the other points than the grid points may be calculated from the input signal values R, G, and B by an interpolation process.

In step S602, the printing process unit 112 performs a color separation process that converts the R', G', and B' obtained by the device color conversion process in step S601 into signal values of ink colors C (cyan), M (magenta), Y (yellow), and K (black) to be used by the image printing apparatus 908. In the color separation process too, the conversion may be done by a calculation using a mathematical equation or be done using a three-dimensional LUT. Here, the output signal values are separated into signals of the four colors C, M, Y, and K. In the case when the image printing apparatus 908 uses a larger number of ink colors, the printing process unit 112 generates as many signal values as the number of ink colors.

In step S603, the printing process unit 112 executes a quantization process. The quantization level may be two or three or more as long as the image printing apparatus 908 can handle values obtained by such quantization. As for the method of the quantization process, a publicly known error diffusion method or dithering method can be employed. Here, in the case when the original image is a photographic image, it is preferable to employ an error diffusion method or a dithering method using a dithering matrix having blue noise characteristics to suppress graininess in the print product. By the above step, the printing process by the printing process unit 112 ends. Note that the printing process by the printing process unit 112 may be executed using an existing ICC profile.

Referring back to the flowchart shown in FIG. 3, after the printing process in step S211 is completed, the generated quantized CMYK data is transmitted to the image printing apparatus 908 through the data transfer I/F 907 (see FIG. 1). By the above operation, the processing ends.

On the other hand, in the image printing apparatus 908, the CPU 911 controls the printer engine 915 by following the quantized CMYK data received from the image processing apparatus 901 to thereby print an image onto the specified print medium, and outputs the print product.

Figure 7:
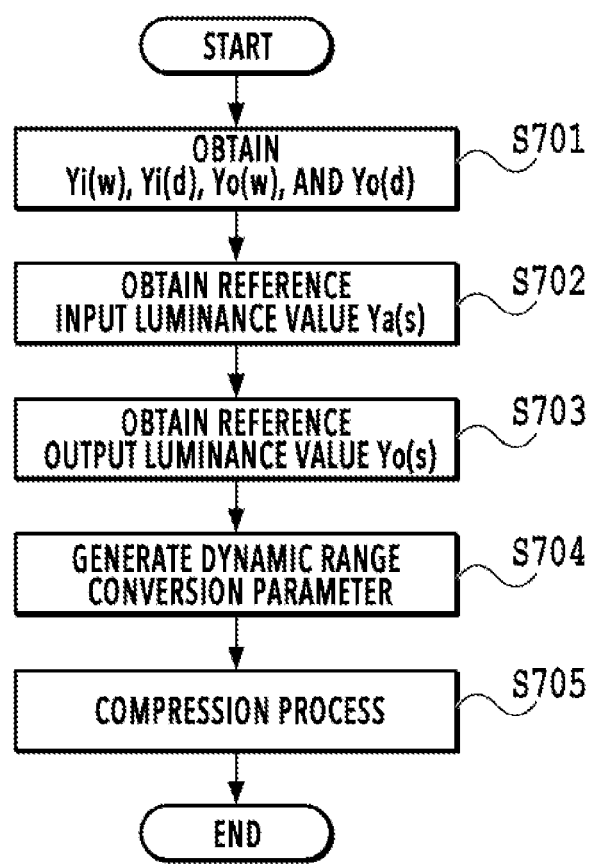
FIG. 7 is a flowchart for explaining a dynamic range compression process.

The dynamic range compression process will be specifically described below. FIG. 7 is a flowchart for explaining the dynamic range compression process in step S207 shown in FIG. 3. Upon a start of this process, first, in step S701, the dynamic range compression unit 108 obtains the input white reference luminance value Yi(w), the input black reference luminance value Yi(d), the output white reference luminance value Yo(w), and the output black reference luminance value Yo(d), obtained in steps S203 and S204.

Here, referring to FIG. 5A again, in the case when, for example, the camera type is A, the high luminance obtaining mode is selected, and the expansion number N is 1, the input white reference luminance value Yi(w)=440% and the input black reference luminance value Yi(d)=0%. Then, the dynamic range compression unit 108 allocates the range between these two values 0 to 440% to signal values expressed by 16 bits (0 to 65535). Specifically, assuming Di as the dynamic range of the input luminance data, Di is calculated with (equation 4).

$$Di = Yi(w) - Yi(d) \quad \text{(equation 4)}$$

Also, assume a case when, for example, the brightness of the high-intensity light obtained by the observation environment information obtaining unit 104 is 200 cd/m² and the print medium type is I. Then, referring to FIG. 5C, the output white reference luminance value Yo(w)=180 cd/m², and the output black reference luminance value Yo(d)=9 cd/m². The dynamic range compression unit 108 then allocates the range between these two values 9 to 180 cd to signal values expressed by 16 bits (0 to 65535). Specifically, assuming Do as the dynamic range of the output luminance data, Do is calculated with (equation 5).

$$Do=Yo(W)-Yo(D) \quad \text{(equation 5)}$$

In step S702, the dynamic range compression unit 108 obtains a reference input luminance value Ya(s). The reference input luminance value Ya(s) represents a luminance value Yi(s) obtained by performing photometry during the image capture with the image capture device and having undergone the gamma correction in step S303. Here, the luminance value obtained by the photometry with the camera is denoted as Yi(18) (s=18%), and a reference input luminance value corresponding to this is denoted as Ya(18).

In step S703, the dynamic range compression unit 108 obtains a reference output luminance value Yo(s). The reference output luminance value Yo(s) represents the reference input luminance value Ya(s) after the dynamic range conversion. In the present embodiment, the reference output luminance value Yo(s) is set to a value obtained by adding the amount of increase in the luminance value of a black region by the illumination with the high-luminance light to the reference input luminance value Ya(s), i.e., a value higher (brighter) than Ya(s). The reference output luminance value Yo(s) can be calculated with (equation 6).

$$Yo(s)=Yo(D)+Ya(s) \quad \text{(equation 6)}$$

Then, in step S704, the dynamic range compression unit 108 generates a dynamic range conversion parameter. Specifically, the dynamic range compression unit 108 associates the input white reference luminance value Yi(w) with a largest input signal value Si(w)=65535 and associates the input black reference luminance value Yi(d) with a smallest input signal value Si(d)=0. Also, the dynamic range compression unit 108 associates the output white reference luminance value Yo(w) with a largest output signal value So(w)=65535 and associates the output black reference luminance value Yo(d) with a smallest output signal value So(d)=0. Further, the dynamic range compression unit 108 calculates a 16-bit signal value (Si(s)) corresponding to the reference input luminance value Ya(s) and a 16-bit signal value (So(s)) corresponding to the reference output luminance value Yo(s) by using the above two dynamic ranges Di and Do.

$$Si(18)=65535 \times (Ya(18)/Di)$$

$$So(18)=65535 \times (Yo(18)/Do) \quad \text{(equation 7)}$$

Thereafter, using three sets of coordinates (Si(w), So(w)), (Si(s), So(s)), and (Si(d), So(d)), the dynamic range compression unit 108 generates a conversion line that passes these three points. In the present embodiment, this conversion line is an approximate line passing the three points (Si(w), So(w)), (Si(s), So(s)), and (Si(d), So(d)). While the approximation method for calculating the approximate line is not particularly limited, for example, a sigmoid function, a logarithmic function, or the like, is preferable. Using the obtained conversion line, the dynamic range compression unit 108 generates such a conversion parameter that each 16-bit (0 to 65535) input signal corresponds to one of the 16-bit (0 to 65535) output signals. The conversion parameter may be, for example, a one-dimensional lookup table in which the input luminance signals and the output luminance signals correspond to each other on a one-to-one basis, or a function for conversion from the input luminance signals to the output luminance signals. In either case, the conversion parameter may only need to be such a parameter that a single input luminance signal corresponds to a single luminance signal.

Note that "conversion line" herein is a base for generating the "conversion parameter" and represents the path of the correlation between the input luminance and the output luminance, with the input luminance on the horizontal axis and the output luminance on the vertical axis. In its graphs, the horizontal axis is expressed in (%) and the vertical axis is expressed in (cd/m$^2$), but the units for the "conversion line" are not limited.

In step S705, the dynamic range compression unit 108 converts each input luminance signal Y, received from the frequency separation unit 107, into an output luminance signal Y' by using the conversion parameter generated in S704. By the above step, this process ends.

Figure 8A:
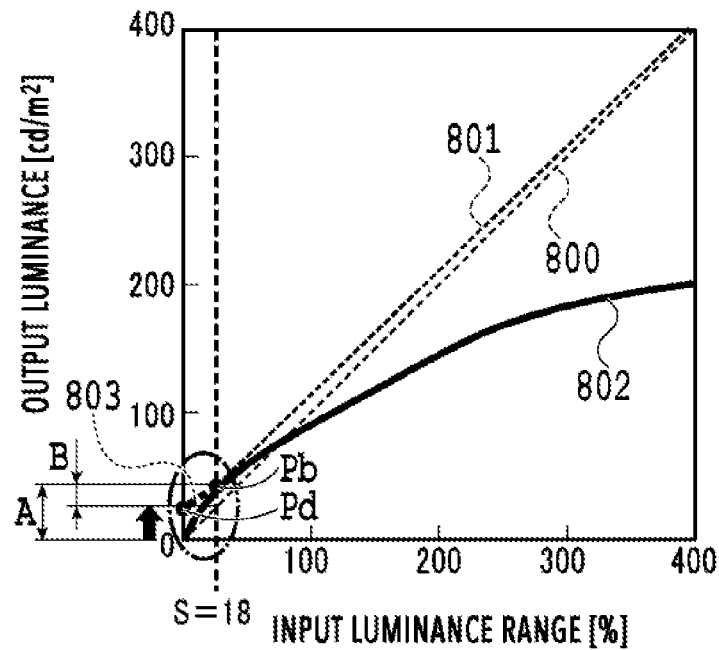
FIGS. 8A and 8B are diagrams for comparing the present invention and a conventional example.
Figure 8B:
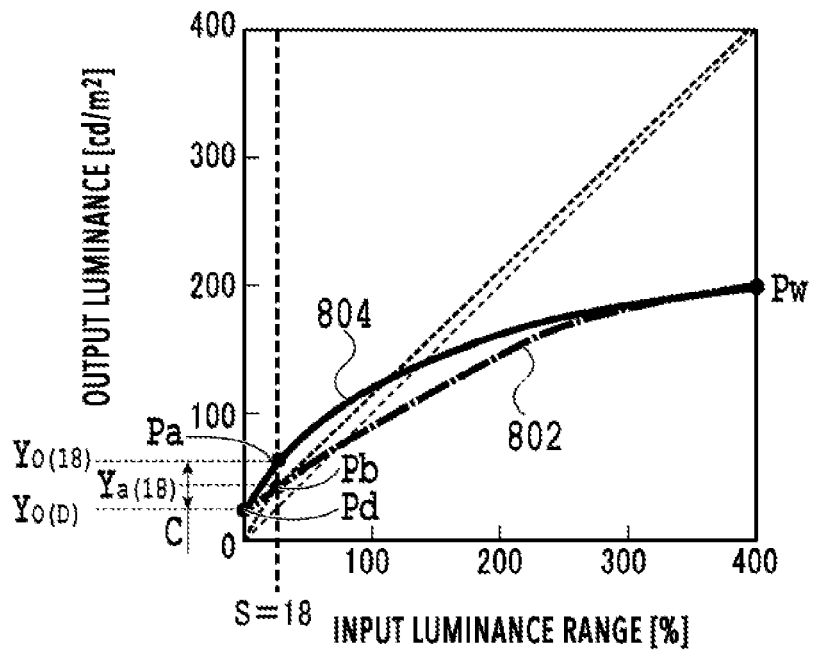

FIGS. 8A and 8B are diagrams for comparing a curve obtained by performing the dynamic range compression process in the present embodiment and a curve obtained by using a conventional technique, each curve indicating the relation between the input luminance and the output luminance. In both diagrams, the horizontal axis represents an input luminance range in the unit of (%), and the vertical axis represents output luminance in the unit of (cd/m$^2$). Note that this example assumes that 1%=1 cd/m$^2$, representing a substantially equivalent conversion function.

In FIG. 8A, a curve 801 represents a case of displaying an image captured by a digital camera on a 400-(cd/m$^2$) display. The output along the curve 801 is slightly brighter than that along a straight line 800, along which the input luminance is equal to the output luminance, due to the camera's color reproduction design (color creation). On the other hand, a curve 802 represents a case of displaying the image captured by the digital camera on a 200-(cd/m$^2$) display. The dynamic range is compressed while maintaining the correspondence between an input luminance of 18% (s=18%) and an output luminance of 18 (cd/m$^2$).

Figure 12B:
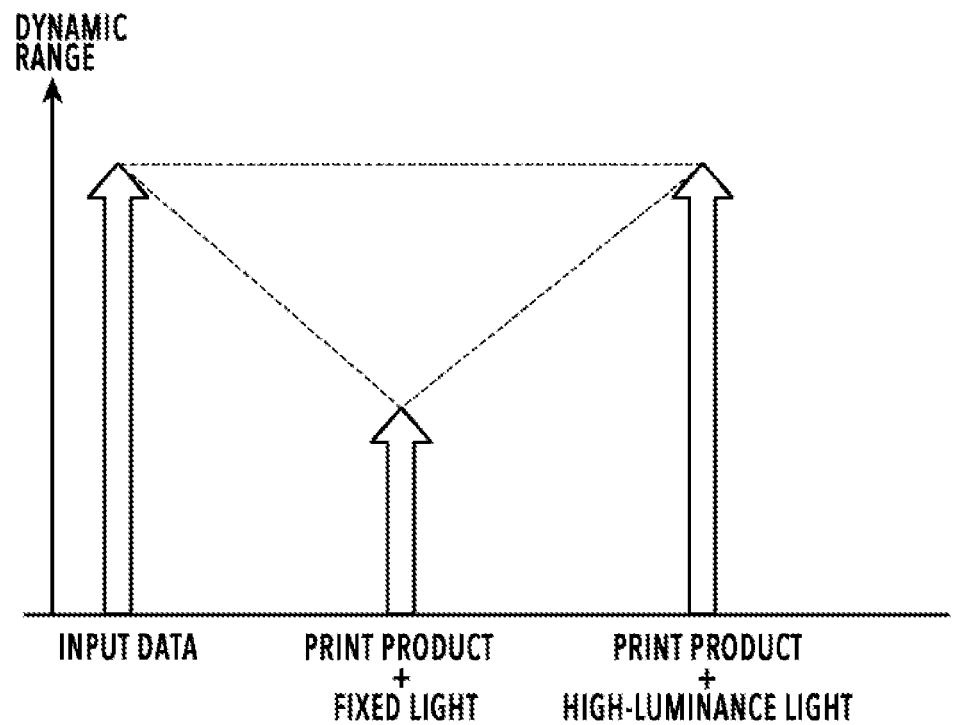

Meanwhile, in color reproduction with a print product, the dynamic range is likely to be greatly narrowed. However, the dynamic range can be widened to be as wide as that on a display by employing an illumination exhibition method, as described using FIGS. 12A and 12B. Specifically, even in color reproduction with a print product, the input-output relation on a high-luminance side can be close to that of the curve 802 if, for example, the print product is illuminated by a high-luminance light such that the brightness observed at a highest-luminance region of the print product with light applied thereto is 200 cd/m$^2$.

However, on a print product illuminated by a high-luminance light, the luminance of a black region (lowest luminance) rises as well and becomes a value higher than zero. In FIG. 8A, the rise in lowest luminance is illustrated by a black arrow, and this point will be referred to as a point Pd. Assuming that the value of the curve 802 at the reference luminance value s=18% is a point Pb, in the output luminance, the range from the lowest luminance value, which is 0%, to the reference luminance value s=18% is narrowed from a range A (the range indicated by the point Pb) to a range B (the range difference between the point Pb and the point Pd), both illustrated in the diagram. The output between the point Pb and the point Pd therefore appears as a line with a small gradient, as illustrated by a dotted line 803. Consequently, the tonality in the low-luminance range of 0 to 18% is impaired, thereby giving observers a low-contrast, blurry impression.

On the other hand, in FIG. 8B, a curve 804 represents the relation between the input luminance and the output luminance in the case of executing the dynamic range compression process by the method in the present embodiment. The curve 804 corresponds to the conversion line generated in step S704. In the present embodiment, the conversion line is generated using an approximation method in a state when the set of coordinates (Si(w), So(w)), corresponding to a point Pw, the set of coordinates (Si(d), So(d)), corresponding to the point Pd, and the set of coordinates (Si(18), So(18)), corresponding to a point Pa, are fixed. The point Pa is a point calculated using equation 6 with S=18, an output value Ya(18) at S=18 without the light taken into consideration (point Pb), and Yo(D). Thus, the output luminance in a middle range is higher than that of the approximate curve 802. Moreover, in the range of 0 to 18%, the range difference between the point Pa and the point Pd is a range C. Thus, the range is wide and the gradient of the curve is high as compared to the range B in FIG. 8A. Consequently, the tonality in the low-luminance range is not impaired, so that observers perceive suitable contrast. Note that, in the present embodiment, the point Pa is calculated using equation 6. However, the point Pa is not limited to this point. The point Pa may be a different point as long as the range C has a range difference equal to or greater than the range A. In other words, the point Pa needs to be such that the difference in luminance across the input luminance range of 0 to 18% is equal to or greater than that in the case when the image is displayed on a display having the curve 802 in FIG. 8A.

Note that, in the dynamic range conversion process in the present embodiment, the reference input luminance value Ya(18) is not used as a fixed point for generating the conversion line. Thus, there is a difference between the input luminance value at 18% (point Pa) and the output luminance value Yo(18). However, according to the present inventor's studies, the degree of this difference is found not to ruin the creator's intent when checked with the eyes.

On the other hand, if one wishes to minimize the difference, a coefficient m (0<m<1) may be prepared, and the equation for calculating the output luminance value Yo(18) may be changed from (equation 6) to (equation 8).

$$Yo(18)=m\times Yo(d)+Ya(18) \quad \text{(equation 8)}$$

By varying the value of m between 0 and 1 in (equation 8), it is possible to appropriately adjust the balance between appropriate contrast in a low-luminance range, which the present invention is intended to achieve, and the fixing of the reference luminance value.

In the above description, an approximate curve is calculated with three points fixed. Note, however, that the gradient of the curve may be adjusted by taking into consideration the contrast of the entire image including a high-luminance range. For example, a histogram of the luminance values of all pixels included in the input image data may be obtained, and a conversion line may be generated so as to have a higher gradient in a high-luminance range with high frequencies than in other ranges. In this way, when observers look at the image with their eyes, they may sense suitable contrast over the entire image.

Second Embodiment

The conversion line for converting the dynamic range described in the first embodiment does not have very high gradients in a luminance value range of 18% and above since the gradient of the conversion line is high in the range of 0 to 18%. Then, in the case of an image containing many pieces of luminance data at or above 18%, the image may give observers the impression that contrast is insufficient.

To solve such a problem, in the present embodiment, an image region is divided into a plurality of regions, and a suitable conversion line is prepared for each of the divided regions. In each of these conversion lines, the gradient (contrast) in the luminance value range of 0 to 18% is maintained to be similar to that in the first embodiment. On the other hand, as for the range of 18% and above, the gradient is appropriately distributed for each individual divided region.

In the present embodiment too, the image processing apparatus illustrated in FIGS. 1 and 2 is used, and image processing is executed by following the flowchart illustrated in FIG. 3.

Figure 9:
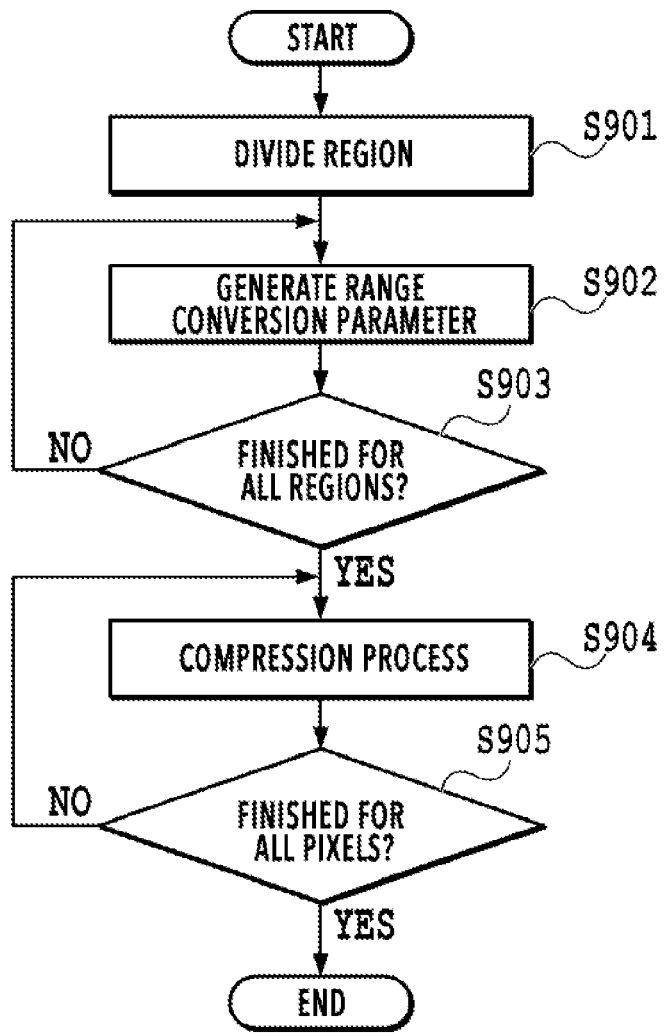
FIG. 9 is a flowchart for explaining a dynamic range compression process.

FIG. 9 is a flowchart for explaining steps executed by the dynamic range compression unit 108 in S207 in FIG. 3. Upon start of this process, first, in step S901, the dynamic range compression unit 108 partitions the entire image into a plurality of divided regions.

FIGS. 10A to 10C are diagrams illustrating how the dynamic range compression unit 108 divides the image in S901. FIG. 10A illustrates the original image. FIG. 10B illustrates a case when the original image is divided into divided regions of the same shape. FIG. 10C illustrates a case when the original image is divided into a plurality of regions by grouping pixels having similar degrees of luminance. In this case, not only the luminance data (Y), but also, the RGB data developed by the development unit 102 may be used to group pixels having similar values of color information. In the present embodiment, either division method can be employed.

Referring back to the flowchart shown in FIG. 9, in S902, the dynamic range compression unit 108 generates a conversion parameter for converting the dynamic range of one of the plurality of divided regions obtained by the division in S901. Details of the conversion parameter will be specifically described later.

In step S903, the dynamic range compression unit 108 determines whether a conversion parameter has been generated for all of the plurality of divided regions generated in step S901. If a conversion parameter has not been generated for all, the dynamic range compression unit 108 returns to S902 and generates a conversion parameter for the next divided region. On the other hand, if a conversion parameter has been generated for all, the dynamic range compression unit 108 proceeds to step S904. By repeating steps S902 and S903, an individual conversion parameter is generated for each of the divided regions generated in step S901.

In step S904, the dynamic range compression unit 108 sets one of the plurality of pixels included in the image data as a processing target pixel and executes a dynamic range compression process for the processing target pixel. Specifically, the dynamic range compression unit 108 selects the conversion parameter for the divided region including the processing target pixel among the plurality of conversion parameters generated in steps S902 and S903, and converts the input luminance signal of the processing target pixel into an output luminance signal by using this conversion parameter.

In step S905, the dynamic range compression unit 108 determines whether the dynamic range compression process (signal value conversion process) has been finished for all pixels. If there remains any pixel(s) to be processed, the dynamic range compression unit 108 returns to step S904 and performs the conversion process for the next processing target pixel. On the other hand, if determining that the dynamic range compression process has been finished for all pixels, the dynamic range compression unit 108 ends this process.

Figure 11A:
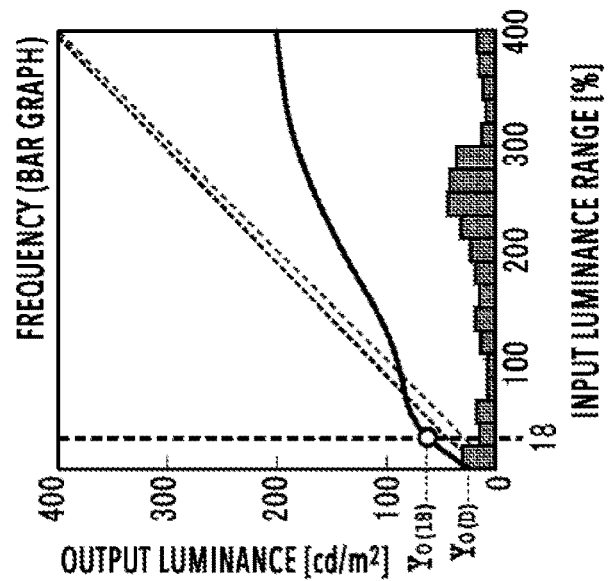
FIGS. 11A to 11C are diagrams illustrating examples of a conversion line.
Figure 11B:
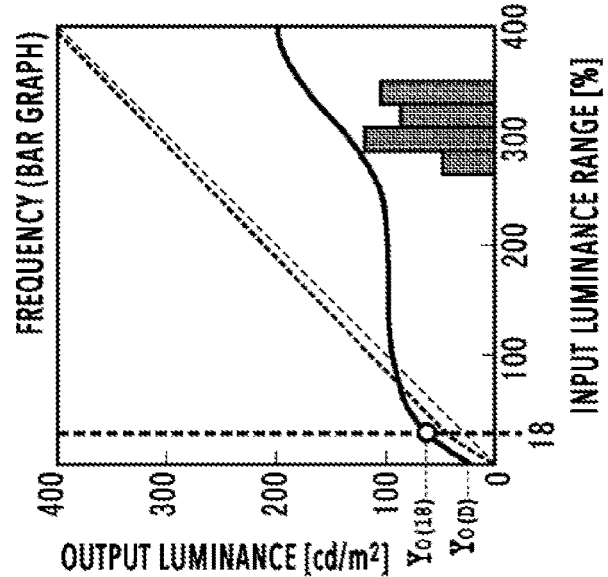
Figure 11C:
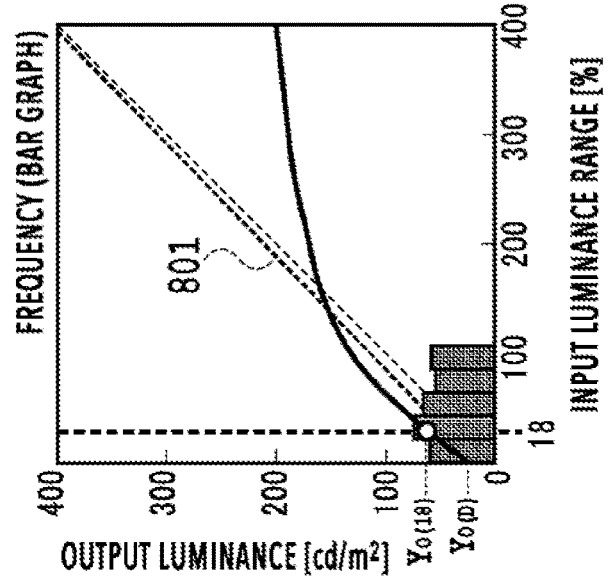

FIGS. 11A to 11C are diagrams illustrating examples of a conversion line generated by the dynamic range compression unit 108 to generate a conversion parameter in step S902. The vertical axis and the horizontal axis are the same as those shown in FIG. 8, mentioned in the first embodiment. Also, in each diagram, the bar graph illustrates the numbers of pixels having different degrees of luminance among the pixels included in a processing target divided region (histogram). For example, FIG. 11A illustrates a case when the divided region includes many pixels with relatively low degrees of luminance. Also, FIG. 11B illustrates a case when the divided region includes many pixels with relatively high degrees of luminance. Further, FIG. 11C illustrates a case when the divided region evenly includes pixels with various degrees of luminance.

In the present embodiment, the gradient in the range of 0 to 18% is maintained to be similar to that in the first embodiment. As for the remaining range, on the other hand, the gradient of the conversion line in any luminance range with high frequencies in the histogram is set as close as possible to "1" (45 degrees) to maintain the contrast in that range. A luminance range with high frequencies in the histogram is a luminance range in the image to be actually printed. Hence, it is preferable to maintain its contrast as much as possible.

Thus, for a divided region including many low-luminance pixels, as shown in FIG. 11A, the gradient is closer to "1" in a low-luminance range (0 to 100%) than in a high-luminance range. Also, for a divided region including many high-luminance pixels, as shown in FIG. 11B, the gradient is closer to "1" in a high-luminance range (260 to 340%) than that in a middle-luminance range of 18% and above (18 to 260%). Further, in the case when a plurality of pixels are evenly distributed over the entire luminance range, as shown in FIG. 11C, the gradient is distributed in accordance with the frequencies in the histogram so as not to be extremely close to zero in the entire luminance range of 18% and above. In any case, it suffices that a conversion line is generated that has its gradient distributed in accordance with frequencies in the histogram while maintaining monotonic increase across the entire input luminance range.

Then, in step S902, using the conversion line thus generated, the dynamic range compression unit 108 generates such a conversion parameter that each 16-bit input luminance signal corresponds to one of the 16-bit output luminance signals. In short, in step S902, the dynamic range compression unit 108 generates an individual conversion line for the processing target divided region and then generates an individual conversion parameter for the divided region.

Note that, in the compression process in step S904, it is desirable to take into consideration conversion information on neighboring divided regions so as to prevent inversion or discontinuity of output luminance between adjacent divided regions. For example, it is effective to employ a method such as one in which a window of substantially the same size as a divided region is disposed centered on the processing target pixel, and the converted value is calculated with a weighting process performed on the pixels included in the window. In this case, using a simple area ratio may lead to defects such as a halo at the boundary between divided regions. Thus, the weight may be varied on the basis of the average luminance of the processing target divided region. Specifically, the occurrence of image defects as mentioned above can be suppressed by varying the weight such that the more different the average luminance of surrounding pixels is from the luminance of the processing target pixel, the lower the weight is.

As described above, according to the present embodiment, it is possible to achieve a suitable contrast expression on the entire image, in addition to the advantageous effect of the first embodiment. In particular, in the case of grouping pixels with similar values of luminance data or RGB data as shown in FIG. 10C, it is possible to reproduce contrasts suitable for recognized region types, such as "mountain", "cloud", and "house" in the respective regions.

Other Embodiments

The above description has been given by taking as an example a case when the value s (=18%) of the photometry performed during the image capture is set as the reference luminance value. However, the present invention is not limited to this case. The configuration may be such that the user inputs an instruction to the image processing apparatus regarding the reference luminance value to be used other than the black luminance and the white luminance for generating a conversion line for converting the dynamic range.

Also, the block diagram illustrated in FIG. 2 is exemplary. The image processing unit 100 of the image processing apparatus 901 does not necessarily have to implement all of the functions. For example, the image capture device 1000, such as a digital camera, may implement the image obtaining unit 101 and the development unit 102. In that case, the image processing apparatus 901 receives developed image data (e.g., in S-RGB format), instead of RAW data, through a predetermined interface. The image format in this operation is not particularly limited, but is desirable to contain sufficient information so that satisfactory tonality and color reproduction quality can be expressed.

Further, in the above embodiments, a configuration has been described using FIGS. 5B and 5C in which the output black reference luminance value Yo(d) and the output white reference luminance value Yo(w) are determined on the basis of the print medium type and the light for observation. However, the present invention is not limited to this configuration. The configuration may be such that the output black reference luminance value Yo(d) and the output white reference luminance value Yo(w) are varied on the basis of various types of information other than the above types of information such as, for example, as the size of the print medium, the size and luminance of the exhibition wall, and the type of ink to be used by the image printing apparatus. In any case, as long as the output luminance value Yo(s) to be associated with the input luminance value Yi(s), which serves as a reference, can be adjusted in accordance with the environment in which the print product is to be exhibited, it is possible to achieve the advantageous effect of the present invention, that is, ensuring certain tonality in a low-luminance range to express suitable contrast.

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
   an obtaining unit configured to obtain image data; and
   a dynamic range conversion unit configured to convert an input luminance signal included in the image data into an output luminance signal for an image printing apparatus by using a conversion parameter such that a dynamic range of luminance of the converted image data is narrower than that of the unconverted image data before the dynamic range conversion,
   wherein, in a case when the input luminance signal indicates an input black reference luminance value, the output luminance signal indicates an output black reference luminance value, and,
   in a case when the input luminance signal indicates a predetermined reference input luminance value, the output luminance signal indicates a reference output luminance value, the reference output luminance value being a value calculated based on the predetermined reference input luminance value and the output black reference luminance value for observing a print product to be printed by the image printing apparatus.

2. The image processing apparatus according to claim 1, wherein the reference output luminance value is higher than the predetermined reference input luminance value.

3. The image processing apparatus according to claim 2, wherein the reference output luminance value is a value obtained by adding the output black reference luminance value to the predetermined reference input luminance value.

4. The image processing apparatus according to claim 1, wherein the reference input luminance value corresponds to a degree of luminance obtained by performing photometry during an image capture with an image capture device.

5. The image processing apparatus according to claim 1, wherein the input white reference luminance value is a highest luminance value in a state when the reference input luminance value is 18%.

6. The image processing apparatus according to claim 1, wherein the reference output luminance value is calculated further by using, an output luminance value with respect to the reference input luminance value without additional light taken into consideration.

7. The image processing apparatus according to claim 1, wherein the conversion parameter is generated based on a histogram for the luminance information on all pixels included in the developed data, and wherein the conversion parameter is generated such that a gradient of the output luminance signal with respect to the input luminance signal in a luminance range with a higher frequency in the histogram is higher than the gradient in another luminance range and the conversion line monotonically increases across an entire luminance range.

8. The image processing apparatus according to claim 1, wherein an image region of the developed data is divided into a plurality of divided regions and the conversion parameter is generated for each of the divided regions individually.

9. The image processing apparatus according to claim 8, wherein the image region is divided into the plurality of divided regions by grouping pixels included in the developed data and having similar values of luminance information or similar values of color information.

10. The image processing apparatus according to claim 1, wherein the dynamic range compression unit converts the input luminance signal in luminance data of a low-frequency component in the developed data into the output luminance signal by using the conversion parameter.

11. The image processing apparatus according to claim 1, wherein the image printing apparatus prints an image onto a print medium in accordance with the converted image data.

12. The image processing apparatus according to claim 11, wherein the image printing apparatus is an inkjet printer to eject ink.

13. The image processing apparatus according to claim 11, further comprising a development unit configured to develop the captured image data captured by an image capture device, wherein the obtaining unit obtains the captured image data.

14. The image processing apparatus according to claim 1, wherein a difference between the reference output luminance value and the output black reference luminance value included in the image data is greater than or equal to a difference between the predetermined reference input luminance value and an input black reference luminance value included in the image data.

15. The image processing apparatus according to claim 1, wherein, in a case when the input luminance signal included in the image data indicates an input white reference luminance value, the output luminance signal indicates an output white reference luminance value for observing the print product to be printed by the image printing apparatus.

16. The image processing apparatus according to claim 1, wherein the dynamic range conversion unit generates the conversion parameter.

17. The image processing apparatus according to claim 1, wherein the dynamic range conversion unit obtains the output black reference luminance value and the output white reference luminance value, based on print medium information for printing by the image printing apparatus.

18. The image processing apparatus according to claim 1, wherein the dynamic range conversion unit obtains the output black reference luminance value and the output white reference luminance value, based on print medium information for printing by the image printing apparatus and observation environment information for observing the print product.

19. The image processing apparatus according to claim 1, wherein the dynamic range conversion unit obtains the output black reference luminance value and the output white reference luminance value, based on observation environment information for observing the print product.

20. The image processing apparatus according to claim 19, wherein the print medium information includes a type of the print medium to be used in the printing by the image printing apparatus, and the observation environment information includes information on light to be used for observation of the print product, the output black reference luminance value is equivalent to a luminance value of a black region of the print medium indicated by the print medium information in a state when the black region is illuminated by the light indicated by the observation environment information, and the output white reference luminance value is equivalent to a luminance value of a white region of the print medium indicated by the print medium information in a state when the white region is illuminated by the light indicated by the observation environment information.

21. An image processing method comprising:
obtaining image data;
converting an input luminance signal included in the image data into an output luminance signal for an image printing apparatus by using a conversion parameter such that a dynamic range of luminance of the converted image data is narrower than that of the image data; and
generating image data printable by the image printing apparatus,
wherein, in a case when the input luminance signal indicates an input black reference luminance value, the output luminance signal indicates an output black reference luminance value, and,
in a case when the input luminance signal indicates a predetermined reference input luminance value, the output luminance signal indicates a reference output luminance value, the reference output luminance value being a value calculated based on the predetermined reference input luminance value and the output black reference luminance value for observing a print product to be printed by the image printing apparatus.

22. The image processing method according to claim 21, wherein the reference output luminance value is higher than the predetermined reference input luminance value.

23. The image processing method according to claim 22, wherein the reference output luminance value is a value obtained by adding the output black reference luminance value to the predetermined reference input luminance value.

24. The image processing method according to claim 21, wherein the reference input luminance value corresponds to a degree of luminance obtained by performing photometry during an image capture with an image capture device.

25. The image processing method according to claim 21, wherein the input white reference luminance value is a highest luminance value in a case when the reference input luminance value is 18%.

26. The image processing method according to claim 21, wherein the reference output luminance value is calculated further by using an output luminance value with respect to the reference input luminance value without additional light taken into consideration.

27. The image processing method according to claim 21, wherein the conversion parameter is generated based on a histogram obtained for the luminance information on all pixels included in the developed data, and the conversion parameter is generated such that a gradient of the output luminance signal with respect to the input luminance signal in a luminance range with a higher frequency in the histogram is higher than the gradient in any other luminance range and the conversion line monotonically increases across an entire luminance range.

28. The image processing method according to claim 21, wherein an image region of the developed data is divided into a plurality of divided regions and the conversion parameter is individually generated for each of the divided regions.

29. The image processing method according to claim 19, wherein the image region is divided into the plurality of divided regions by grouping pixels included in the developed data and having similar values of luminance information or similar values of color information.

30. The image processing method according to claim 12, wherein, in the converting, the input luminance signal in luminance data of a low-frequency component in the developed data is converted into the output luminance signal by using the conversion parameter.

31. The image processing method according to claim 12, wherein the image printing apparatus prints an image onto a print medium in accordance with the converted image data.

32. The image processing method according to claim 22, wherein the image printing apparatus is an inkjet printer to eject ink.

33. The image processing method according to claim 31, further comprising performing a development process on the image data that is captured by an image capture device.

34. The image processing method according to claim 21, wherein a difference between the reference output luminance value and the output black reference luminance value included in the image data is larger than or equal to a difference between the predetermined reference input luminance value and an input black reference luminance value included in the image data.

35. The image processing method according to claim 21, wherein in a case when the input luminance signal included in the image data indicates an input white reference luminance value the output luminance signal indicates an output white reference luminance value for observing the print product to be printed by the image printing apparatus.

36. The image processing method according to claim 21, wherein in the converting step, the conversion parameter is generated.

37. The image processing method according to claim 21, wherein in the converting step, the output black reference luminance value and the output white reference luminance value are obtained, based on print medium information for printing by the image printing apparatus.

38. The image processing method according to claim 21, wherein, in the converting step, the output black reference luminance value and the output white reference luminance value are obtained, based on print medium information for printing by the image printing apparatus and observation environment information for observing the print product.

39. The image processing method according to claim 21, wherein, in the converting step, the output black reference luminance value and the output white reference luminance value are obtained, based on observation environment information for observing the print product.

40. The image processing method according to claim 39, wherein the print medium information includes a type of the print medium to be used in the printing by the image printing apparatus, and the observation environment information includes information on a light to be used for observation of the print product, the output black reference luminance value is equivalent to a luminance value of a black region of the print medium indicated by the print medium information in a state when the black region is illuminated by the light indicated by the observation environment information, and the output white reference luminance value is equivalent to a luminance value of a white region of the print medium indicated by the print medium information in a state when the white region is illuminated by the light indicated by the observation environment information.

41. A non-transitory computer readable storage medium storing a program that causes a computer to perform the functions of an image processing method, the image processing method comprising:
  obtaining image data;
  converting an input luminance signal included in the image data into an output luminance signal for an image printing apparatus by using a conversion parameter such that a dynamic range of luminance of the converted image data is narrower than that of the image data; and
  generating image data printable by the image printing apparatus,
  wherein, in a case when the input luminance signal indicates an input black reference luminance value, the output luminance signal indicates an output black reference luminance value, and,
  in a case when the input luminance signal indicates a predetermined reference input luminance value, the output luminance signal indicates a reference output luminance value, the reference output luminance value being a value calculated based on the predetermined reference input luminance value and the output black reference luminance value for observing a print product to be printed by the image printing apparatus.

* * * * *